United States Patent
Matter et al.

(10) Patent No.: US 6,701,469 B1
(45) Date of Patent: Mar. 2, 2004

(54) DETECTING AND HANDLING BUS ERRORS IN A COMPUTER SYSTEM

(75) Inventors: Eugene P. Matter, Folsom, CA (US); Blaise Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,419

(22) Filed: Dec. 30, 1999

(51) Int. Cl.$^7$ .......................... G06F 11/00; G06F 11/07; H03K 19/003
(52) U.S. Cl. ..................... 714/703; 714/43; 714/56
(58) Field of Search ................ 714/30, 36, 43, 714/56, 703, 736, 799, 3, 807, 818–812, 18; 709/234; 710/128, 307, 316, 317; 370/216–228

(56) References Cited

U.S. PATENT DOCUMENTS

| | | | |
|---|---|---|---|
| 4,245,344 A | * | 1/1981 | Richter .................... 714/43 |
| 4,503,535 A | * | 3/1985 | Budde et al. .............. 714/47 |
| 4,521,848 A | * | 6/1985 | Bruce et al. .............. 714/43 |
| 4,974,144 A | * | 11/1990 | Long et al. .............. 710/306 |
| 5,311,520 A | * | 5/1994 | Raghavachari ............ 714/723 |
| 5,423,050 A | * | 6/1995 | Taylor et al. ............. 714/31 |
| 5,838,899 A | * | 11/1998 | Leavitt et al. ............ 714/56 |
| 5,954,810 A | * | 9/1999 | Toillon et al. ............ 710/315 |
| 6,012,148 A | * | 1/2000 | Laberge et al. ............ 714/2 |
| 6,049,894 A | * | 4/2000 | Gates ...................... 714/41 |
| 6,240,526 B1 | * | 5/2001 | Petivan et al. ............ 714/11 |

OTHER PUBLICATIONS

"A New Design Method for TU1n Signal Alignment, Monitoring and Switching Function in BDCS Systems"—Choi et al. Proceedings of Communications and Signal Processing Information, 1997. ICICS., 1997 International Conference On page(s):790–793 vol. 2 9–12 S.*
Using Dual and Mappable Spare Bus IBM Technical Disclosure Bulliten Feb. 1994 NB940259.*

* cited by examiner

Primary Examiner—Alberta Decady
Assistant Examiner—Cynthia Britt
(74) Attorney, Agent, or Firm—Fish & Richardson P.C.

(57) ABSTRACT

Digital signals are sent in a predetermined sequence from one end of a bus wire and are received at the other end. Each of the digital signals of the received sequence is compared with a corresponding predetermined signal of the predetermined sequence to determine whether an error has occurred. Data obtained concerning bus errors may be used to handle bus errors during runtime.

21 Claims, 6 Drawing Sheets

DETECTING AND HANDLING BUS ERRORS IN A COMPUTER SYSTEM

TECHNICAL FIELD

This invention relates to detecting and handling bus errors in a computer system.

BACKGROUND

Data travels from site to site within a computer along connections known generally as buses. Most computers have a way to check the data sent along a bus, to assure the data has not been corrupted in transit. If a discrepancy in the data is detected, some form of error correction or control is applied. Many computers use error correcting routines for correcting transient or non-repeating errors. For other errors, such as a breakdown in the bus hardware, the error correcting routine may call for a shutdown of the system until the breakdown can be repaired.

SUMMARY

In general, in one aspect, the invention features sending digital signals in a predetermined sequence from a sending end of a bus wire, receiving a corresponding sequence of digital signals at a receiving end of the bus wire, and comparing each of the digital signals of the received sequence with a corresponding predetermined signal of the predetermined sequence to determine whether an error has occurred.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

The invention enables testing for non-transient bus errors during a reset cycle and the taking of appropriate action to allow the system to function. The invention also enables detection of bus errors during system operation, and the taking of appropriate action to avoid system shutdowns.

Figure 1:
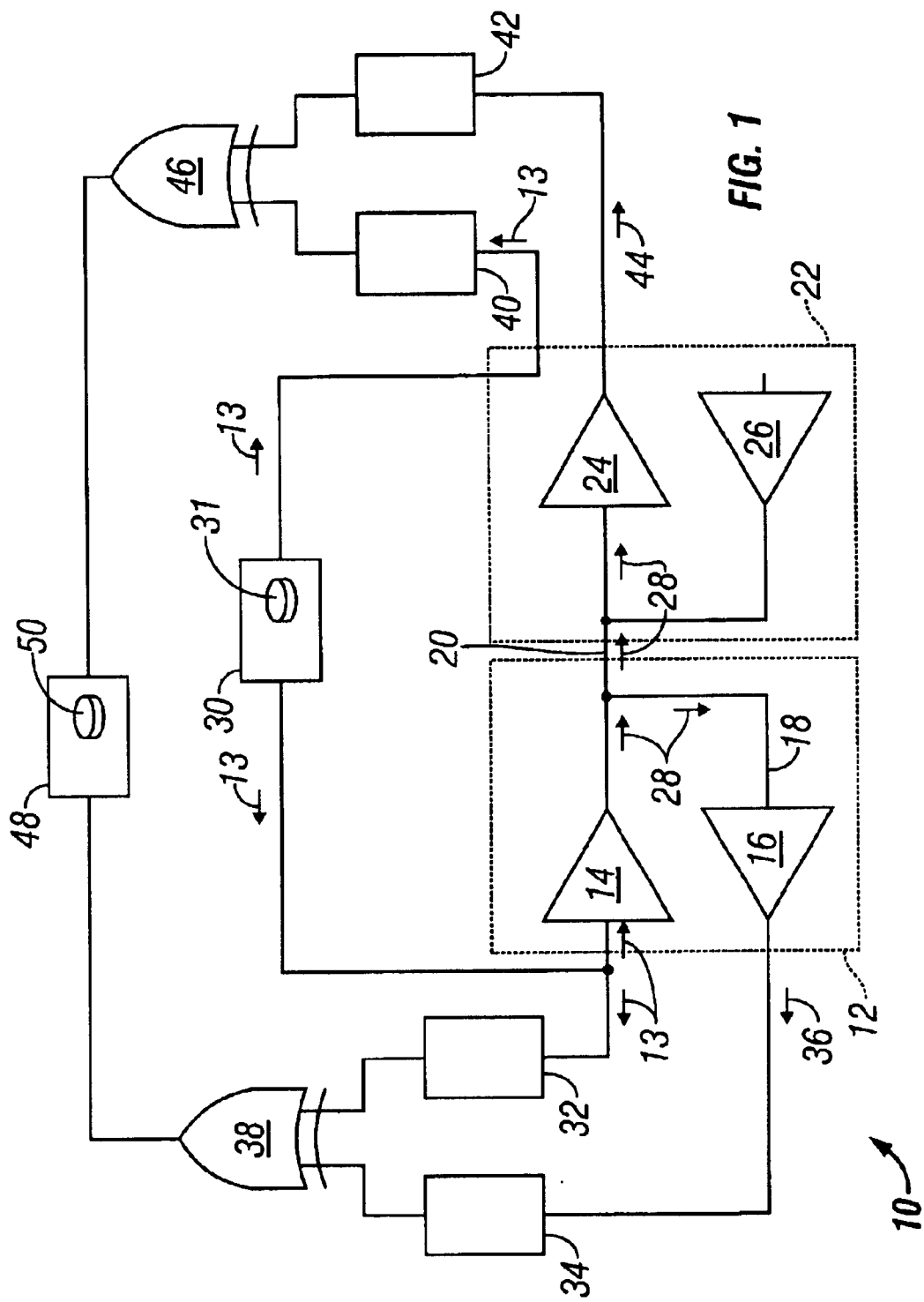
FIG. 1 is a block diagram of an embodiment of the invention.

FIG. 1 shows an embodiment of the invention for a single communication channel 10. A communication channel is a path by which data are transmitted. Communications channel 10 may include bus wire 20 and, as shown by FIG. 1, may further include other elements. Data travels from one end of the channel to the other on a bus wire 20. Transceivers 12, 22 are connected to each end of the bus wire 20. Each transceiver (12 and 22) includes a driver or sender (14 and 24, respectively) and a receiver (16 and 26, respectively). A similar circuit arrangement is used for other bus wires of this bus (not shown).

During a reset or power up cycle, a first processor 30 generates a pre-arranged pattern of data bits. The pattern of data bits may be stored in memory 31. Each data bit 13 in turn is temporarily stored or latched in input/output registers 32 and 40 on both ends of the bus wire 20. Each data bit 13 is also sent to the driver 14 on one end of the bus wire 20. The driver 14 transmits the data bit 28 on the bus wire 20. The transmitted data bit 28 "loops back" along connection 18 and is received by receiver 16 on the same end of the bus wire 20 from which it was sent. The data bit 28 is also received on the opposite side of the wire by receiver 24. The received bits (36 and 44) are then latched in compare registers (34 and 42, respectively). On each side of the bus, the bit stored in the input/output register (32 and 40) is checked against the bit stored in the compare register (34 and 42, respectively) by a comparator (38 and 46, respectively). Comparators 38, 46, modeled in FIG. 1 as exclusive OR logic gates, may be any device capable of comparing bits stored in the input/output registers (32 and 40) with the bits stored in the compare registers (34 and 42). The results of the comparison are sent to a second processor 48. Second processor 48 may be embodied in the same hardware as first processor 30. Discrepancies between the data bit expected to be sent on the bus wire 20 and the data bit actually sent 28, are noted by the second processor 48. The second processor 48 can use the discrepancy information for a variety of purposes, including determination of the nature of the error causing the discrepancy.

Discrepancies may be due to many kinds of bus errors. The type of discrepancy detected may indicate the kind of fault causing it. If receiver 24 consistently receives a series of logical "1's," for example, this may suggest a "stuck at high" fault in driver 14. In a similar way, if receiver 24 consistently receives a series of logical "0's," this may suggest a "stuck at low" fault in driver 14. If receiver 24 receives a pattern of data bits very dissimilar to the pattern being sent by driver 14, this may suggest an open circuit or a damaged connection. Other kinds of mutations to the bit patterns sent by first processor 30 may be characteristic of other kinds of faults.

When the invention is used during a system's power up or reset cycle, the system automatically performs a diagnostic operation on a bus wire 20 by generating a series of pre-set data bit patterns from first processor 30 and observing whether the data bits actually sent on the bus 28 are the same as those data bits that are supposed to be sent. Discrepancies may be noted by the second processor 48 and recorded in an error history table 50. In addition, the second processor 48 may evaluate the nature of the error, whether it is transient, and how it may be circumvented, and may store this information in the error history table 50. The second processor 48 may also make error data available to the system user.

FIG. 1 shows the implementation as it relates to signals traveling from left to right on the bus wire 20. In this implementation driver 26 in transceiver 22 plays no role. For signals traveling from right to left, the converse implementation applies. Driver 26 is active and driver 14 is passive.

Figure 2:
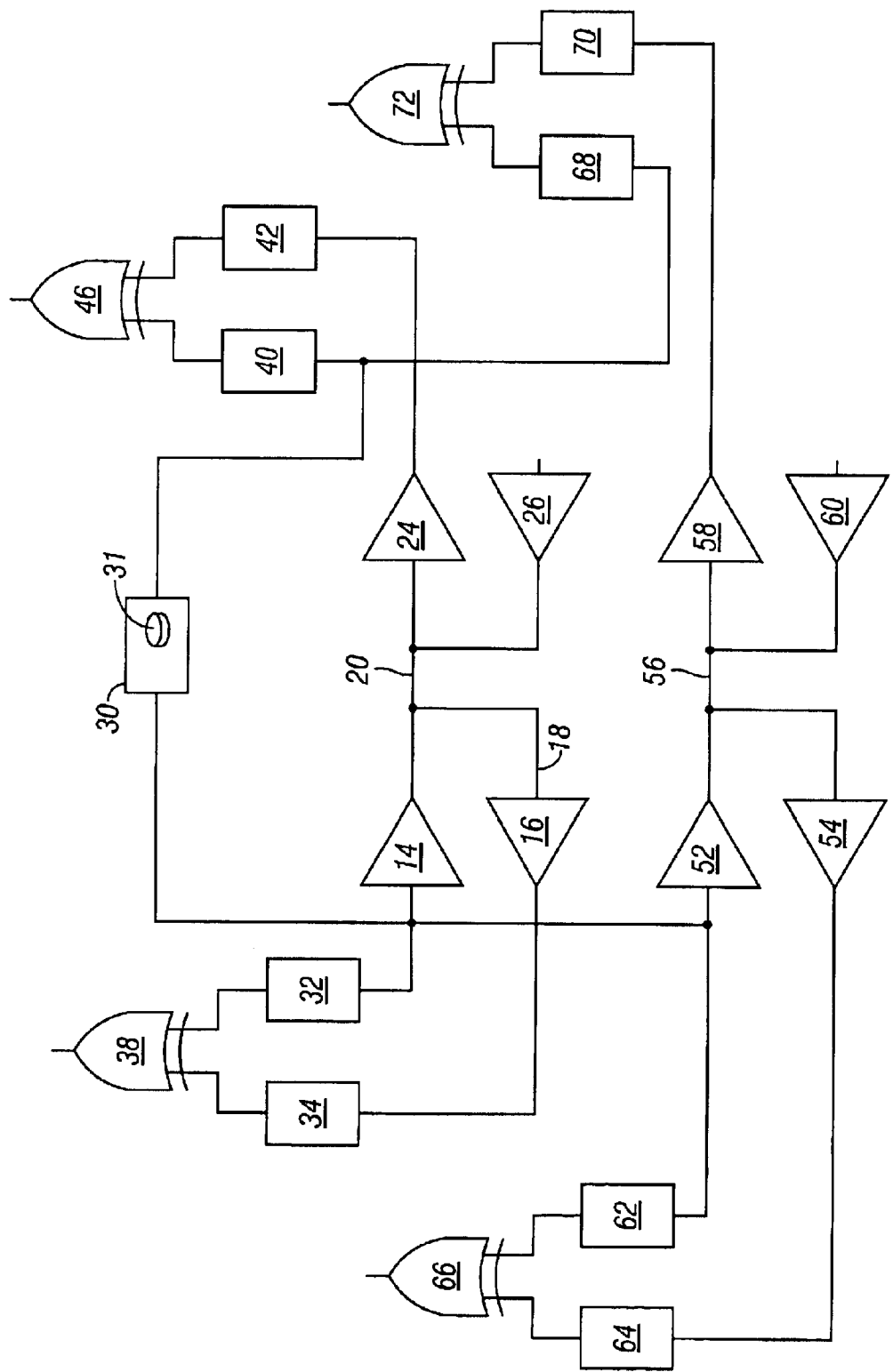
FIG. 2 is a block diagram of another embodiment of the invention.

FIG. 2 shows an implementation as it relates to two parallel communication channels. A second bus wire 56, parallel to the first bus wire 20, is connected to another driver-receiver pair on each end (52, 54 and 60, 58). The second bus wire also has input/output registers (62 and 68), compare registers (64 and 70) and comparators (66 and 72). The results of the comparisons are sent to a second processor not shown in FIG. 2.

In FIG. 2 the bus wires 20, 56 are tested with the same data bit sequence sent from first processor 30. Under some circumstances, it may be desirable for the first processor 30 to send one data bit to one bus wire while contemporaneously sending a different bit to a neighboring bus wire. If receiver 24 receives a pattern of data bits similar to the pattern being sent on a parallel bus wire 56, this may suggest a short circuit between bus wires 20 and 56, or it may suggest "cross-talk" among parallel wires on the bus.

Figure 3:
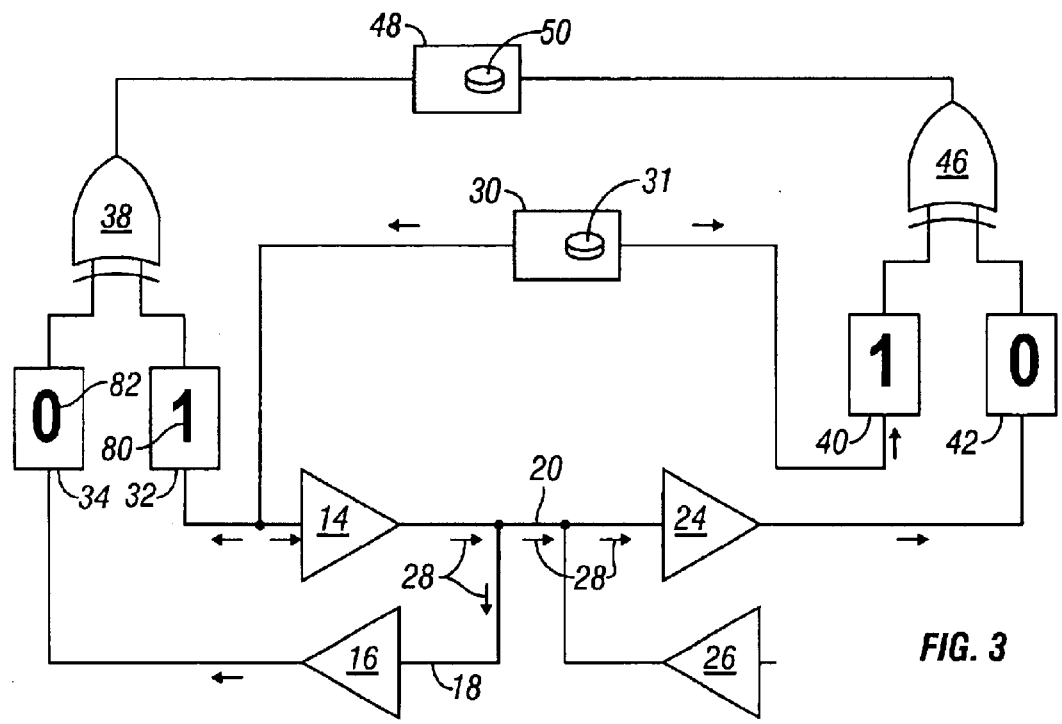
FIG. 3 is a block diagram of another embodiment of the invention.
Figure 4:
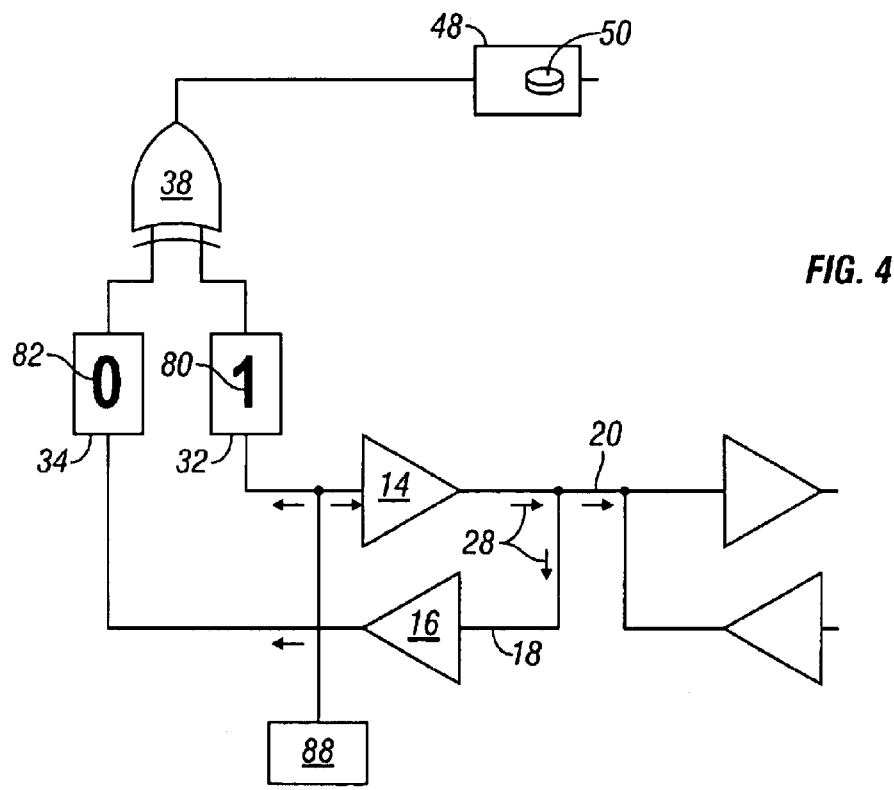
FIG. 4 is a block diagram of another embodiment of the invention.

FIG. 3 demonstrates one example of error-checking during a reset cycle. FIG. 3 is like FIG. 1, and the first processor has actually sent a logical "1" data bit 80, which has been stored in input/output latches 32 and 40 on both ends of the bus wire 20. The data bit sent 28 on the bus wire 20 is received by the receivers 16 and 24. Receiver 16 receives a logical "0" data bit 82, which is stored in latch 34, and receiver 24 also receives a logical "0" data bit 84, which is stored in latch 42. On each end of the channel, the comparators 38 and 46 will send a signal to the second processor 48 indicating a mismatch. The second processor 48 may store this information in the error history table 50. The second processor 48 may also evaluate this information in connection with other information received when the first processor 30 sends out different data bits and store its evaluation in the history table 50. Errors may also be detected and evaluated after the reset cycle is complete, while the system is in operation (also called "runtime") as shown in FIG. 4. FIG. 4 is like FIG. 1, except data bits to be transmitted on the bus wire 20 come from a system element 88 such as an input unit. In FIG. 4, the system element 88 has actually sent a logical "1" data bit 80, which has been stored in input/output latch 32. The data bit sent 28 on the bus wire 20 is received by the receiver 16. Receiver 16 receives a logical "0" data bit 82, which is stored in latch 34. Comparator 38 will send a signal to the second processor 48 indicating a mismatch. The second processor 48 may store this information in the error history table 50. The second processor 48 may also evaluate this information in connection with other information received when the system element 88 sends different data bits, and store its evaluation in the history table 50.

Figure 5:
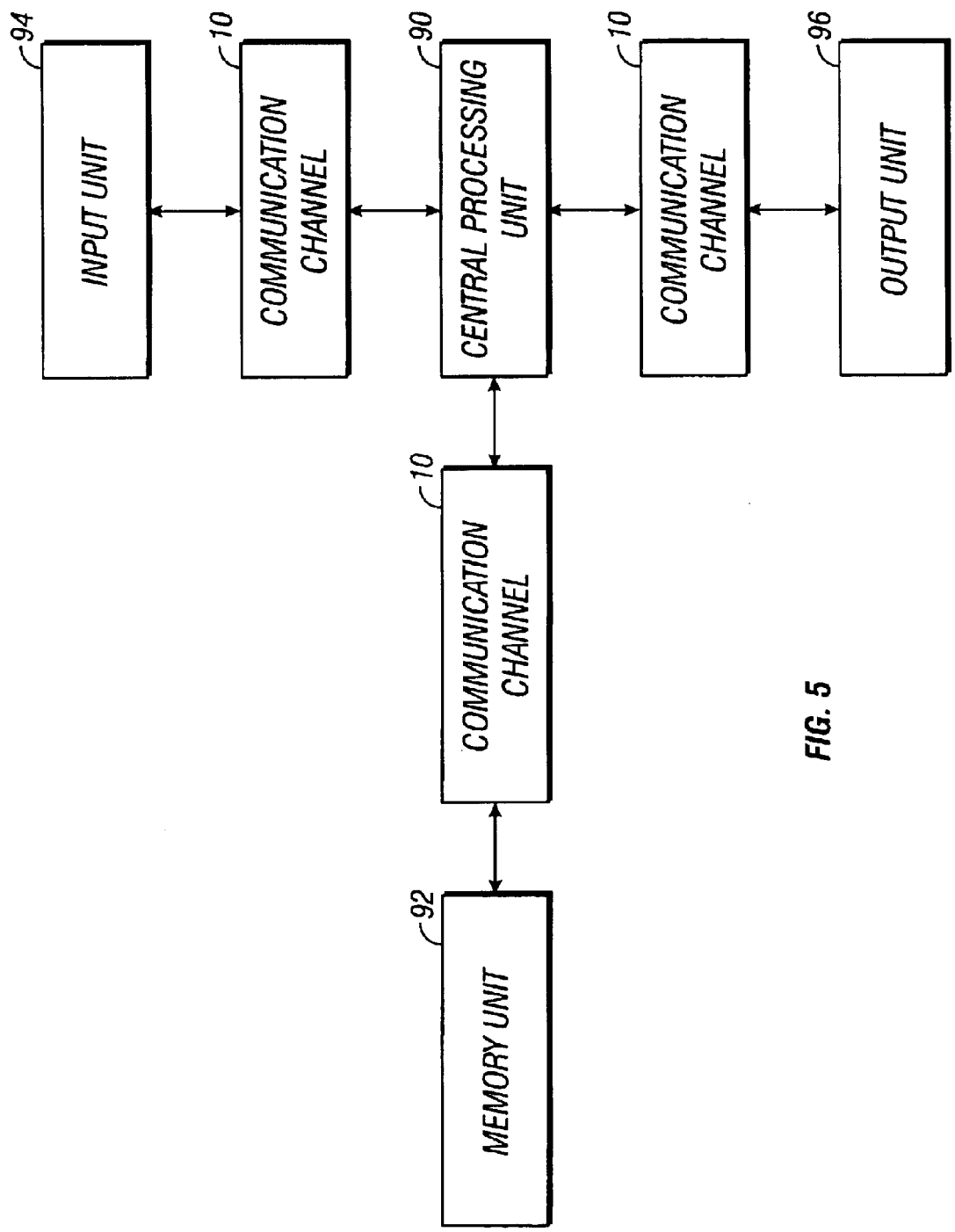
FIG. 5 is a block diagram of another embodiment of the invention.

FIG. 5 shows how the invention may have wide-ranging application within a computer system. Computer functions are frequently compartmentalized within different units. Four units depicted within the simplified computer system of FIG. 5 are the central processing unit 90, a memory unit 92, an input unit 94 and an output unit 96. The central processing unit 90 must be able to communicate with the other units. Connecting the central processing unit 90 to another units is a communication channel 10, which may consist of one or more bus wires.

Figure 6:
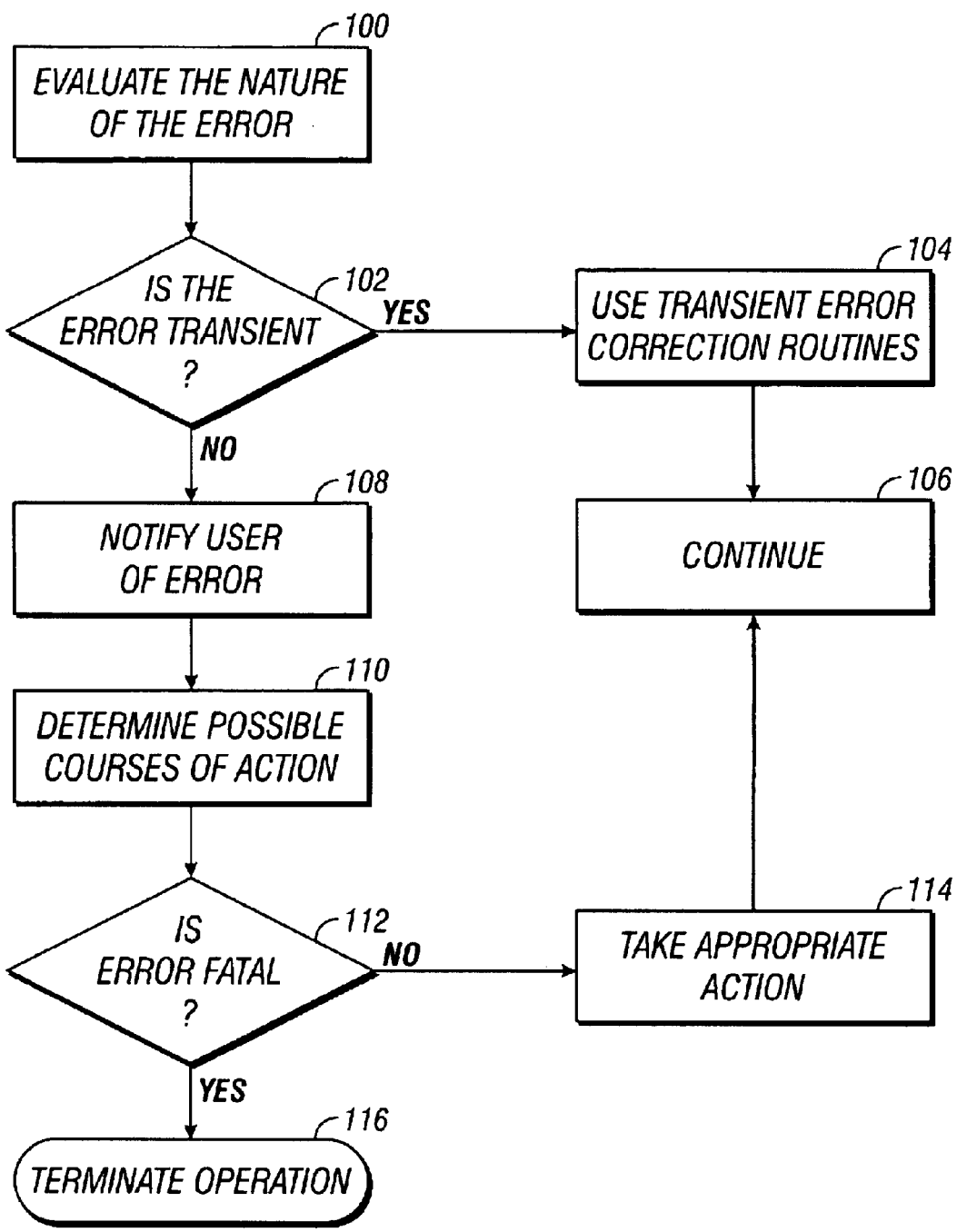
FIG. 6 is a flowchart showing error-handling steps.

FIG. 6 is a flowchart showing steps that may be taken when a bus error is encountered. The error may be evaluated (100), e.g., by determining the kind of error encountered, such as "stuck on high." Evaluation of the error (100) often would lead to a determination as to whether the error is transient (102). If the error is transient, it may be handled by transient error correction routines (104) and the bus communications may continue (106). If the error is transient, typically the data are retransmitted. If the error is not transient, the user may be notified of the error (108) in a suitable fashion. The possible ways for handling the error should also be determined (110). Steps 108 and 110 may take place in any order.

There are several possible forms of error-handling that require no system shut-down and no intervention by the system user. In some circumstances, some hardware used to transmit data may not be working properly, yet data may be transmitted using existing functional hardware resources. The second processor 48 may use error data collected during the reset cycle to determine appropriate action for handling bus errors during runtime. The most appropriate way to handle a particular bus error may depend upon the hardware configuration, the kind of error detected, and the data in the error history table 50. For example, a particular bus wire may have been found to be defective. The second processor 48 may re-map the bus, routing data originally intended for the bad bus wire to a good bus wire, then reassembling the data on the receiving end. This procedure may require multiple data transmissions. This is just one example of using existing functional hardware resources for the transmission of data. Another appropriate action may be to use "bit shifting" and "bit swizzling" to route the data to functional bus wires, followed by reassembling the data on the receiving end. Another way to handle an error may be to route data originally intended for the bad bus wire to a redundant bus wire, then reassembling the data on the receiving end. This procedure may require a single data transmission. Another appropriate action may be to "serialize and packetize" the data, reformatting the data to run serially with a start bit and a stop bit, then reassembling the data on the receiving end. This procedure would permit data transmissions to continue on a single bus wire, even though other bus wires in a communication channel were nonfunctional. Another appropriate action may be to alter the bus transmission frequency. Some errors which manifest themselves at a low frequency may not manifest themselves at a high frequency, and vice versa.

It is possible that the error may not be capable of being handled, and this may be fatal to the system operation (112). In that case, the system terminates operation (116). If the error can be handled, however, appropriate action may be taken (114) and the system may continue without termination (106).

Figure 7:
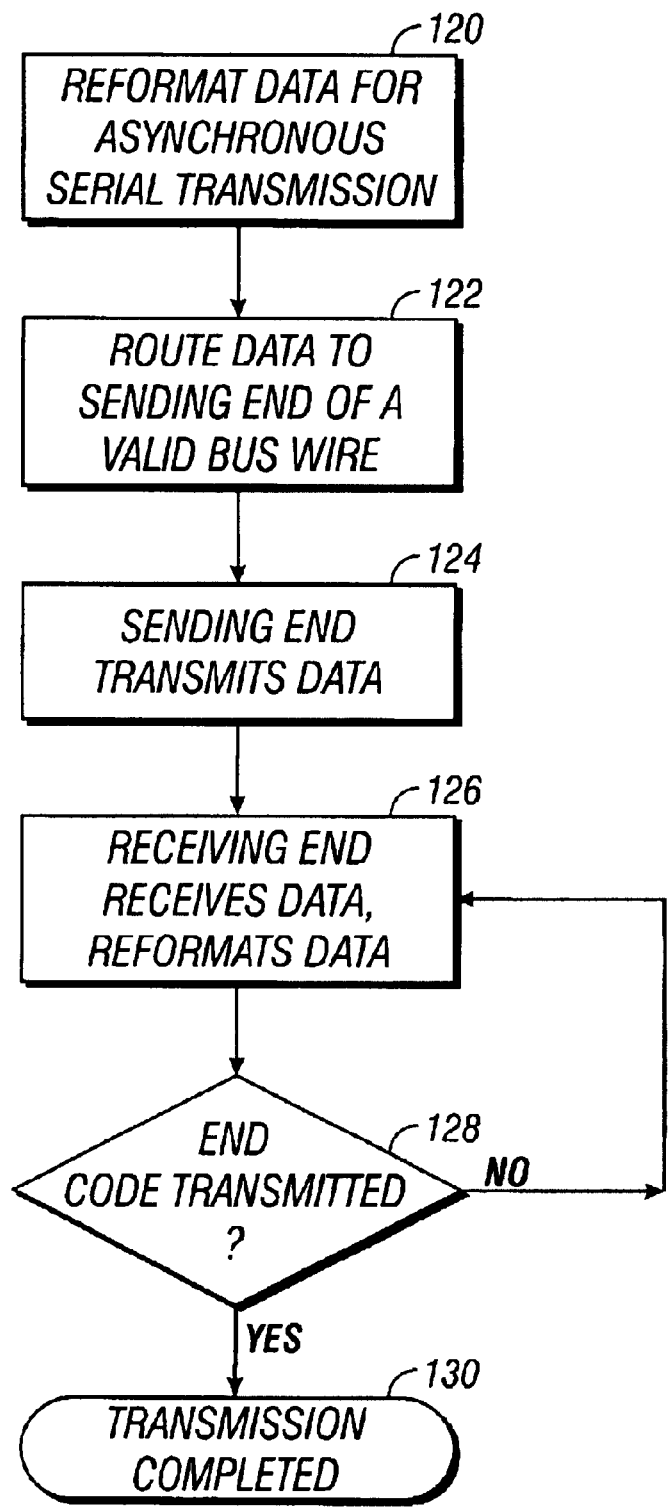
FIG. 7 is a flowchart showing additional error-handling steps.

FIG. 7 is a flowchart showing steps for one form of error-handling, "serializing and packetizing." Using "serializing and packetizing," data may be sent along a bus even if only one of its bus wires is functional. With the assumption that "serializing and packetizing" is an appropriate procedure for the data being transmitted, the data must be reformatted for transmission in serial form (120). Reformatting may include, for example, adding start bits, stop bits and an end code to the data. The data may then be routed to a valid bus wire (122) for transmission (126). The receiving end receives and reformats the data if necessary. The receiving end also checks for the end code (128) which will signal the end of the transmission (130).

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:

sending predetermined digital signals from a first processor in a predetermined sequence to a sending end of a first bus wire;

sending predetermined digital signals from the first processor in a predetermined sequence to two digital signal storing registers, wherein a first digital signal storing register is connected to the sending end of the first bus wire and a second digital storing register is connected to a receiving end of the first bus wire;

sending predetermined digital signals from the sending end of the first bus wire to a third digital signal storing register;

receiving a corresponding sequence of digital signals at the receiving end of the first bus wire;

sending the corresponding sequence of digital signals at the receiving end of the first bus wire to a fourth digital signal storing register;

comparing the digital signals of the second digital signal storing register and the digital signals of the fourth digital signal storing register to determine whether a non-transient error has occurred at the receiving end of the first bus wire;

comparing the digital signals of the first digital signal storing register and the digital signals of the third digital signal storing register to determine whether a non-transient error has occurred at the sending end of the first bus wire;

sending comparison information from the receiving end and the sending end of the first bus wire to a second processor on a disparate path from the first bus wire and a second bus wire; and routing digital signals intended for the first bus wire to the second bus wire if a non-transient error has occurred in either the receiving end or the sending end of the first bus wire.

2. The method of claim 1, wherein the comparison of digital signals at the sending end and receiving ends of the first bus wire comprises an exclusive OR logic gate.

3. The method of claim 1 wherein the sending of digital signals from the sending end of the first bus wire comprises a transceiver, wherein a transceiver driver is connected between the first processor and the first bus wire and a transceiver receiver is connected between the first bus wire and the fourth digital signal storing register.

4. The method of claim 1, further comprising correcting a transient error on the first bus wire by using a transient error correction routine to retransmit the digital signals on the second bus wire.

5. The method of claim 1, further including determining the type or source of error based upon detected mutations to the sequence of digital signals on the first bus wire.

6. The method of claim 1, further including recording errors within a history table.

7. The method of claim 6, further comprising updating the history table to record error-related data obtained during active system operation.

8. The method of claim 6, further including using data recorded within the history table to correct bus errors without intervention of the user.

9. The method of claim 6, further including using data recorded within the history table to avoid future bus errors without intervention of the user.

10. The method of claim 1, further including correcting a non-transient bus error without stopping the operation of the system.

11. The method of claim 1, further including reassembling data after transmission along the first bus.

12. The method of claim 1, in which the method is initiated automatically in response to a reset signal.

13. A medium storing machine-readable instructions operative to cause a machine to perform the following steps:

sending predetermined digital signals from a first processor in a predetermined sequence from a sending end of a first bus wire;

receiving a corresponding sequence of digital signals at a receiving end of the first bus wire;

at the receiving end of the first bus wire, comparing each of the digital signals of the received sequence with corresponding predetermined digital signals of the predetermined sequence to determine with a second processor whether a non-transient error has occurred; and routing signals intended for the first bus wire to a second bus wire if a non-transient error occurred, wherein the second processor is connected neither to the first bus wire nor the second bus wire.

14. An apparatus for detecting bus errors, comprising:

a transceiver on each end of a first bus wire;

memory storing a predetermined order of predetermined digital signals to be sent by the transceiver along the first bus wire;

a transceiver on each end of a second bus wire;

a memory storing a predetermined order of predetermined digital signals to be sent by the second transceiver along the second bus wire, wherein the predetermined order of the predetermined digital signals on the second bus wire differs from the predetermined order on the first bus wire; and a processor to compare the predetermined digital signals on the first and second bus wires to determine it an error occurred.

15. The apparatus of claim 14, further comprising memory for recording error data in an error history table.

16. The apparatus of claim 14, further comprising logic and routines to transmit data using existing functional hardware resources.

17. A computer system comprising:

a central processing unit;

a memory unit;

an input unit;

an output unit;

a communication channel connecting at least two of the units, the communication channel comprising a subsystem including a first bus wire, a second bus wire that is parallel and redundant to the first bus wire, and an apparatus to perform a diagnostic on the bus wires;

a first processor adapted to handle non-transient bus errors on the first bus wire without interrupting system operation; and a second processor adapted to reformat data for transmission on the second bus wire, wherein the first processor and the second processor are not directly connected to both the first bus wire and the second bus wire.

18. The system of claim 17, further comprising;

a plurality of logic and routines adapted to evaluate the nature of the errors within the communication channel, wherein the plurality of logic and routines arc further adapted to transmit data on the communication channel using existing functional hardware resources; and one or more additional communication channels.

19. The system of claim 17, wherein the second processor is operative to cause one or more of the following: serial izing and packetizing, transmitting at high frequency, transmitting at low frequency, bit shifting, bit swizzling.

20. The system of claim 19, further comprising a memory, an error history table, and comparators to determine disparity between data intended for transmission on the first and second bus wires and data actually transmitted on the first and second bus wires.

21. A device to handle bus errors during runtime, comprising;

a processor, wherein the processor is operative to cause one or more of the following: serializing and packetizing, transmitting at high frequency, transmitting at low frequency, bit shifting, bit swizzling;

memory including error data; and logic and routines for transmission of data on a first bus wire and a second bus wire using existing functional hardware resources, wherein the second bus wire provides an alternative data transmission path during first bus wire errors.

* * * * *